(12) United States Patent
Zhu et al.

(10) Patent No.: US 11,179,634 B2
(45) Date of Patent: Nov. 23, 2021

(54) CONTENT PRESENTING METHOD, USER EQUIPMENT AND SYSTEM

(71) Applicant: TENCENT TECHNOLOGY (SHENZHEN) COMPANY LIMITED, Guangdong (CN)

(72) Inventors: Yuzhang Zhu, Shenzhen (CN); Lei Jiang, Shenzhen (CN); Junhong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/774,818

(22) PCT Filed: Mar. 2, 2017

(86) PCT No.: PCT/CN2017/075437
§ 371 (c)(1),
(2) Date: May 9, 2018

(87) PCT Pub. No.: WO2017/148413
PCT Pub. Date: Sep. 8, 2017

(65) Prior Publication Data
US 2018/0318713 A1    Nov. 8, 2018

(30) Foreign Application Priority Data
Mar. 3, 2016 (CN) .......................... 201610120288.5

(51) Int. Cl.
*A63F 13/35* (2014.01)
*A63F 13/53* (2014.01)
(Continued)

(52) U.S. Cl.
CPC .............. *A63F 13/53* (2014.09); *A63F 13/35* (2014.09); *A63F 13/86* (2014.09); *G06F 9/48* (2013.01);
(Continued)

(58) Field of Classification Search
CPC ........... A63F 13/53; A63F 13/35; H04N 5/45; H04N 9/69
See application file for complete search history.

(56) References Cited

U.S. PATENT DOCUMENTS 5,410,351 A * 4/1995 Kojima .................. H04N 19/61
375/240.12
5,754,660 A * 5/1998 Shimizu .................. A63F 13/02
381/17
(Continued)

FOREIGN PATENT DOCUMENTS

CN    1293784 A    5/2001
CN    1716313 A    1/2006
(Continued)

OTHER PUBLICATIONS

Beal, Vangie, What is MPEG, Webopedia, https://www.webopedia.com/TERM/M/MPEG.html, printed Aug. 16, 2019 (Year: 2019).*
(Continued)

*Primary Examiner* — Corbett B Coburn
(74) *Attorney, Agent, or Firm* — Sughrue Mion, PLLC

(57) ABSTRACT

A content presenting method includes starting, by user equipment, a 3D application, in response to an instruction for starting the 3D application, the 3D application presenting a simulated object and a virtual screen for the simulated object to watch video content, and receiving, by the user equipment, a content source address from a 3D application server, the content source address being of live content that is currently broadcasted on the 3D application server. The
(Continued)

method further includes obtaining, by the user equipment, audio data and video data from a content providing server, based on the content source address, rendering, by the user equipment, the audio data and the video data to obtain the video content and audio content, playing, by the user equipment, the audio content in the 3D application, and displaying, by the user equipment, the video content, using the virtual screen.

15 Claims, 15 Drawing Sheets

(51) Int. Cl.
 G06F 9/48 (2006.01)
 H04N 5/60 (2006.01)
 A63F 13/86 (2014.01)
 H04N 5/45 (2011.01)
 H04N 9/69 (2006.01)

(52) U.S. Cl.
 CPC ............ *H04N 5/602* (2013.01); *H04N 5/45* (2013.01); *H04N 9/69* (2013.01)

(56) References Cited

U.S. PATENT DOCUMENTS

| | | | | |
|---|---|---|---|---|
| 5,850,455 | A * | 12/1998 | Arnold | H04S 3/00 381/17 |
| 2003/0118192 | A1* | 6/2003 | Sasaki | H04S 3/00 381/17 |
| 2006/0171457 | A1* | 8/2006 | DeGarrido | H04N 5/147 375/240.03 |
| 2008/0306817 | A1* | 12/2008 | Amidon | G06Q 30/02 705/14.61 |
| 2008/0307473 | A1* | 12/2008 | Allen | A63F 13/12 725/104 |
| 2009/0021513 | A1 | 1/2009 | Joshi et al. | |
| 2009/0287790 | A1* | 11/2009 | Upton | H04N 7/17318 709/208 |
| 2010/0125633 | A1* | 5/2010 | Chatani | A63F 13/12 709/205 |
| 2012/0258797 | A1* | 10/2012 | Cullen | H04L 67/38 463/35 |
| 2012/0269353 | A1* | 10/2012 | Herre | G10L 19/008 381/22 |
| 2013/0024774 | A1* | 1/2013 | Basso | H04L 65/1016 715/733 |
| 2014/0126754 | A1* | 5/2014 | Mizuta | H04S 7/301 381/306 |
| 2014/0195912 | A1* | 7/2014 | Odorovic | G06F 3/0484 715/719 |
| 2015/0325226 | A1* | 11/2015 | Rosedale | G10H 5/02 381/119 |
| 2016/0080347 | A1* | 3/2016 | Rappaport | H04L 51/32 726/5 |
| 2016/0085305 | A1* | 3/2016 | Spio | G06F 1/169 381/74 |
| 2017/0086008 | A1* | 3/2017 | Robinson | H04S 7/308 |
| 2018/0068540 | A1* | 3/2018 | Romanenko | G06K 9/3233 |

FOREIGN PATENT DOCUMENTS

| | | |
|---|---|---|
| CN | 102176197 A | 9/2011 |
| CN | 103096134 A | 5/2013 |
| CN | 103389793 A | 11/2013 |
| CN | 103517145 A | 1/2014 |
| CN | 104740874 A | 7/2015 |
| CN | 105187939 A | 12/2015 |
| CN | 105610868 A | 5/2016 |
| CN | 105740029 A | 7/2016 |

OTHER PUBLICATIONS

Blagdon, Jeff, New app brings live pay-per-view events to the PlayStation 3, Aug. 14, 2013, The Verge, https://www.theverge.com/2013/8/14/4619922/pS3-live-events-viewer-app-brings-pay-per-view-events-to-console (Year: 2013).*

International Search Report for PCT/CN2017/075437 dated May 25, 2017 (PCT/ISA/210).

Written Opinion dated May 25, 2017 issued by the International Searching Authority in PCT/CN2017/075437.

Communication dated Mar. 8, 2019 issued by the State Intellectual Property Office of People's Republic of China in counterpart application No. 201610120288.5.

* cited by examiner

CONTENT PRESENTING METHOD, USER EQUIPMENT AND SYSTEM

RELATED APPLICATION

This application is a U.S. national stage application under 35 U.S.C. § 371 of International Patent Application No. PCT/CN2017/075437 filed on May 24, 2016, which claims priority from Chinese Patent Application No. 201610120288.5, filed in the Chinese Patent Office on Mar. 3, 2016, and entitled "CONTENT PRESENTING METHOD, USER EQUIPMENT, AND SYSTEM," which are incorporated herein by reference in their entireties.

BACKGROUND

1. Field

Methods and apparatuses consistent with example embodiments relate to three-dimensional (3D) technologies, and in particular, to a content presenting method, user equipment, and a system.

2. Description of Related Art

Interactive applications related to 3D scenarios have been developed. A 3D application system includes user equipment and a 3D application server, and the user equipment may obtain data of an interactive application from the 3D application server and display the interactive application.

Video switching may need to be performed to display another application or video when user equipment displays a 3D interactive application, and consequently, operations may be very complex. In addition, some interactive applications have built-in browsers. The browser may provide a small window in a corner for a user when the user starts a 3D interactive application, so that the user may view other content on the small window while viewing the 3D interactive application. However, such a presenting manner is only a planarized presentation on the small window, and may have a very poor visual effect.

SUMMARY

According to example embodiments, there is provided a content presenting method of a three-dimensional (3D) application system, the 3D application system including user equipment, a 3D application server, and a content providing server, and the method including starting, by the user equipment, a 3D application, in response to an instruction for starting the 3D application, the 3D application presenting a simulated object and a virtual screen for the simulated object to watch video content, and receiving, by the user equipment, a content source address from the 3D application server, the content source address being of live content that is currently broadcasted on the 3D application server. The method further includes obtaining, by the user equipment, audio data and video data from the content providing server, based on the content source address, rendering, by the user equipment, the audio data and the video data to obtain the video content and audio content, playing, by the user equipment, the audio content in the 3D application, and displaying, by the user equipment, the video content, using the virtual screen.

According to example embodiments, there is provided user equipment of a three-dimensional (3D) application system, the 3D application system further including a 3D application server and a content providing server, and the user equipment including: at least one memory configured to store computer program code; and at least one processor configured to access the at least one memory and operate according to the computer program code. The computer program code includes response code configured to cause the at least one processor to start a 3D application, in response to an instruction for starting the 3D application, the 3D application presenting a simulated object and a virtual screen for the simulated object to watch video content, receiving code configured to cause the at least one processor to receive a content source address from the 3D application server, the content source address being of live content that is currently broadcasted on the 3D application server, and obtaining code configured to cause the at least one processor to obtain audio data and video data from the content providing server, based on the content source address. The computer program code further includes rendering code configured to cause the at least one processor to render the audio data and the video data to obtain the video content and audio content, playing code configured to cause the at least one processor to play the audio content in the 3D application, and displaying code configured to cause the at least one processor to display the video content, using the virtual screen.

According to example embodiments, there is provided a non-transitory computer-readable storage medium storing instructions that cause a processor of user equipment to start a 3D application, in response to an instruction for starting the 3D application, the 3D application presenting a simulated object and a virtual screen for the simulated object to watch video content, receive a content source address from a 3D application server, the content source address being of live content that is currently broadcasted on the 3D application server, and obtain audio data and video data from a content providing server, based on the content source address. The instructions further cause the processor to render the audio data and the video data to obtain the video content and audio content, play the audio content in the 3D application, and display the video content, using the virtual screen.

DESCRIPTION OF EXAMPLE EMBODIMENTS

Figure 1:
FIG. 1 is a schematic diagram of an example of a 3D application scenario according to example embodiments.

Example embodiments of this application provide a content presenting method, so that video content can be intuitively presented in a 3D application without additionally opening a small window by a user, improving video content presentation quality, and also improving efficiency of communication between the user and an interactive application and the video content. The example embodiments of this application further provide corresponding user equipment and a corresponding system. Detailed descriptions are separately provided below.

The following clearly and completely describes the technical solutions in the example embodiments of this application with reference to the accompanying drawings in the example embodiments of this application. Apparently, the described example embodiments are some example embodiments of this application rather than all of the example embodiments. All other example embodiments obtained by a person skilled in the art based on the example embodiments of this application without creative efforts shall fall within the protection scope of this application.

For ease of understanding, the following first briefly describes terms in this application.

A 3D application system in the example embodiments of this application may be understood as a 3D game system.

A 3D game is a stereoscopic video game manufactured based on 3D computer graphics, including, but not limited to: an online 3D game in which multi-players are online, a single player 3D game in which a single player plays a game, and a virtual reality game system established based on a 3D game system. The 3D game is suitable for use in platforms, such as a video game console, a mobile phone game platform, and a personal computer game platform, 3D games on which are all included.

A virtual community is a virtual community environment of a 3D game, and is a game environment manufactured based on 3D computer graphics. The virtual community may include a simulated object corresponding to a player in the game. The virtual community in this application includes a virtual screen, and the virtual screen may be similar to a large virtual screen projected in the external field.

A game anchor is a person that reports and narrates a game on electronic media such as the Internet.

A live game broadcast means broadcasting while playing a game by using an Internet technology.

Using League of Legends (LOL) as an example, a browser is usually built in a game client, and the browser enables a player in the game client to watch a real-time live video and perform simple interaction. However, the concept of virtual community is not included in this product and game players cannot directly perceive the existence of each other. This solution is much more similar to watching a competition in front of a television, but the solutions provided in this application are mainly to create an atmosphere of watching a competition on live.

The example embodiments of this application describe a solution of combining a 3D simulated virtual community with a live video on the Internet, and the solution provided in the example embodiments of this application enables a player to watch, in the simulated virtual community, a live video on the Internet.

A live video on a virtual screen of the virtual community may be a video broadcasted by a game anchor, or may be another live game video. For an example of the virtual community or a 3D application scenario in the example embodiments of this application, refer to FIG. 1 for understanding.

Figure 2:
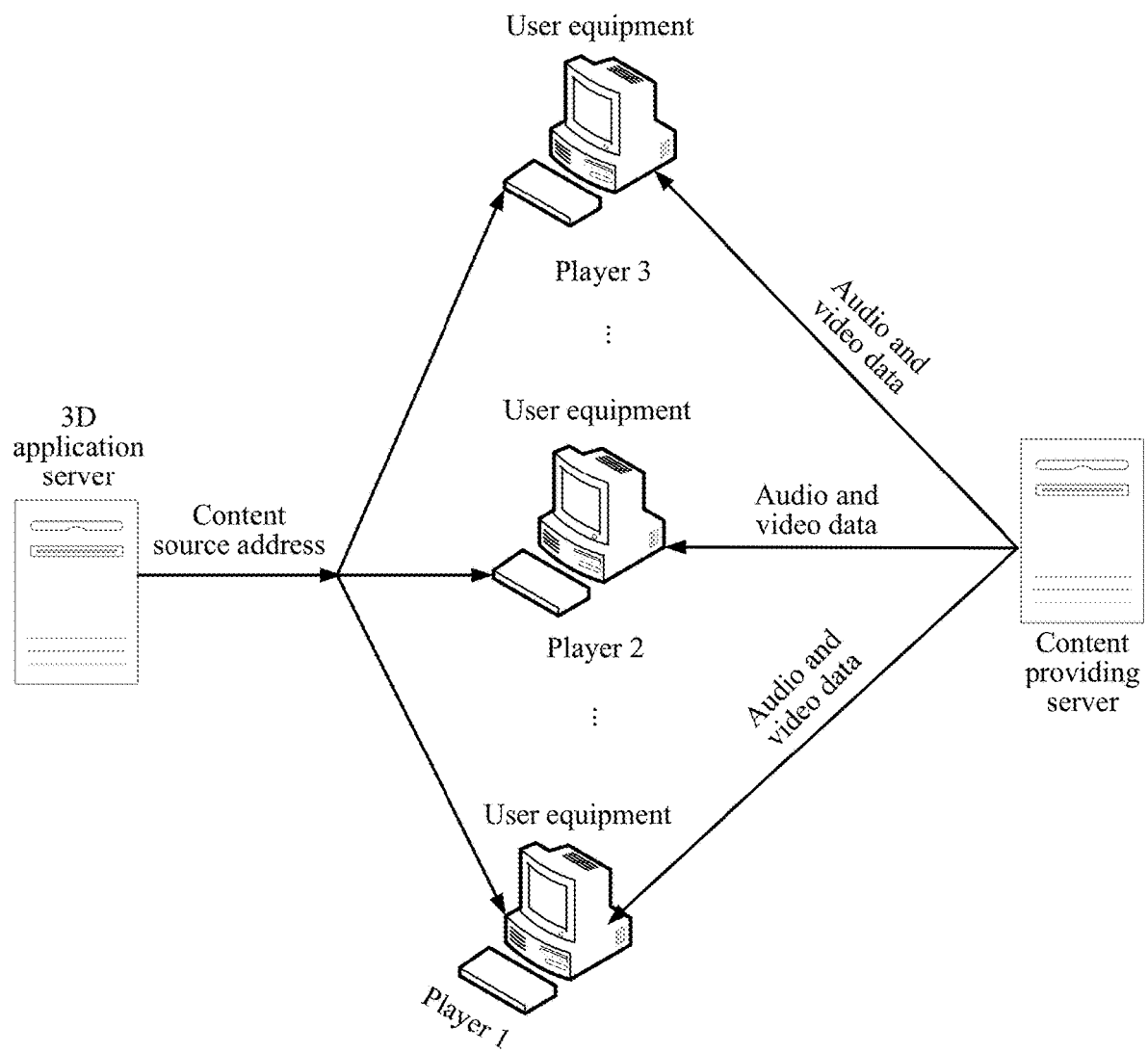
FIG. 2 is a schematic diagram of 3D application system according to example embodiments.

FIG. 2 is a schematic diagram of a 3D application system according to example embodiments.

As shown in FIG. 2, the 3D application system includes a 3D application server, a content providing server, and a plurality of user equipments. Each user equipment may correspond to one player, and each user equipment has installed a client of a 3D application.

The player clicks, on the user equipment, the client of the 3D application, and the user equipment starts the 3D application in response to an instruction for starting the 3D application. The 3D application includes a simulated object and a virtual screen for watching video content by the simulated object, and the simulated object in the 3D application may be a virtual identity of the player in the 3D application.

In a procedure of starting the 3D application, the 3D application requests, from the 3D application server, an address of live content that is currently broadcasted on the virtual screen, that is, a content source address in these example embodiments of this application. The 3D application server sends the content source address to the user equipment after determining the content source address according to the live content that is currently broadcasted.

The user equipment obtains audio and video data from the content providing server according to the content source address after receiving the content source address, and the audio and video data is audio and video data of the live content.

The user equipment renders the audio and video data after obtaining the audio and video data of the live content, to obtain corresponding audio content and video content, and plays the audio content in the 3D application and displays the video content by using the virtual screen.

Figure 3A:
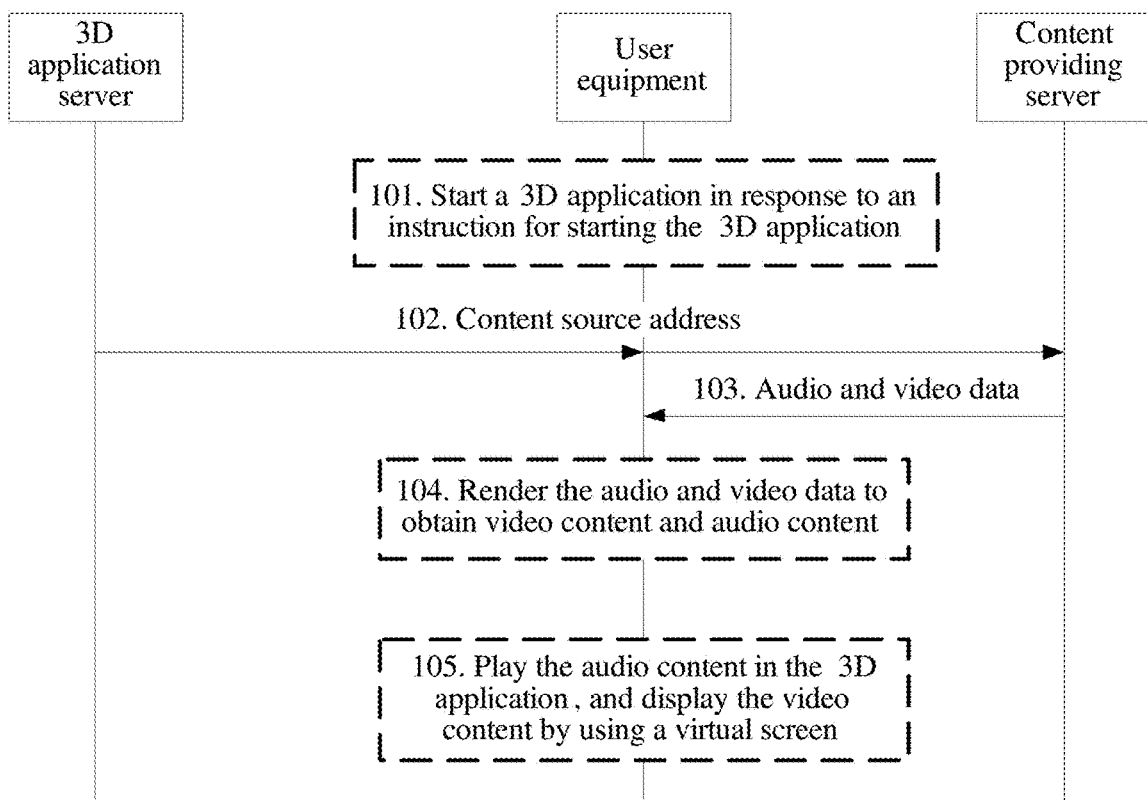
FIG. 3A is a schematic diagram of a content presenting method according to example embodiments.

FIG. 3A is a schematic diagram of a content presenting method according example embodiments.

For a method for presenting a live video in a 3D application, refer to a procedure of FIG. 3 for understanding.

101. User equipment starts a 3D application in response to an instruction for starting the 3D application.

The 3D application includes a simulated object and a virtual screen for watching video content by the simulated object.

102. The user equipment receives a content source address sent by the 3D application server, and sends the content source address to a content providing server.

The content source address is an address of live content that is currently broadcasted on the 3D application server.

103. The user equipment obtains audio and video data from the content providing server according to the content source address.

The audio and video data is audio and video data of a game that is currently played on a game server or of other video content.

104. The user equipment renders the audio and video data to obtain video content and audio content.

105. The user equipment plays the audio content in the 3D application, and displays the video content by using the virtual screen.

A small window may need to be used to display other video content when a 3D application is displayed. By comparison, according to the content presenting method provided in the example embodiments of this application, video content can be presented on a virtual screen of a 3D application without additionally opening a small window by a user, improving video content presentation quality, and also improving efficiency of communication between the user and an interactive application and the video content.

Optionally, the audio and video data includes audio data and video data, and the rendering the audio and video data to obtain video content and audio content includes:

rendering, by the user equipment, the audio data by using a web page process to obtain the audio content, and rendering the video data by using the web page process to obtain the video content; and the playing, by the user equipment, the audio content in the 3D application, and displaying the video content by using the virtual screen includes:

playing, by the user equipment, the audio content by using a process of the 3D application, and displaying the video content on the virtual screen by using the process of the 3D application.

In these example embodiments of this application, the audio data and the video data are rendered by using the web page process, and then are displayed by using the process of the 3D application, so that a page rendered by the web page process is extracted by cross-process communication when web page rendering data is required for the process of the 3D application. The process of the 3D application and the web page process can be separated by such processing, increasing stability of the process of the 3D application.

Further, the video image data includes a plurality of image frames, and the rendering the video data by using the web page process to obtain the video content includes:

determining differential content between an (N+1)th image frame and an Nth image frame when the user equipment renders the (N+1)th image frame by using the web page process, and rendering only the differential content when rendering the (N+1)th image frame, where N is an integer greater than 0.

In these example embodiments of this application, during image frame rendering, repeated content is no longer rendered again, and only differential content between two consecutive frames is rendered, reducing bandwidth consumption of a graphic processing unit (GPU), and improving program execution efficiency and user experience.

Further, before the displaying the video content on the virtual screen by using the process of the 3D application, the method further includes:

performing, by the user equipment, inverse gamma correction on texture of the video content once; and the displaying the video content on the virtual screen by using the process of the 3D application includes:

displaying, by the user equipment on the virtual screen by using the process of the 3D application, video content on which inverse gamma correction has been performed.

In these example embodiments, used maps are maps on which gamma correction has been performed, and if the gamma correction is not performed, an operation result may be incorrect. In this case, image data submitted from another thread has been corrected, and a color cast may occur if the image data is directly put in a high-end rendering pipeline. Therefore, inverse gamma correction is performed on the texture of the video content once.

Further, before the playing, by the user equipment, the audio content by using a process of the 3D application, the method further includes:

introducing, by the user equipment, the audio content into a coordinate system of an interactive application to which the simulated object belongs, and determining audio intensity of the audio content at different coordinate points; and the playing, by the user equipment, the audio content by using a process of the 3D application includes:

playing, by the user equipment at the different coordinate points, the audio content according to the audio intensity corresponding to the coordinate points.

Audio playing intensity of different coordinate points is different; therefore, audio is introduced to the coordinate system, to produce a stereophonic effect.

Further, for the obtaining, by the user equipment, audio and video data from the content providing server according to the content source address, the method further includes:

obtaining, by the user equipment, content of interaction between an anchor of the video content played on the virtual screen and the simulated object; and for the displaying the video content by using the virtual screen, the method further includes:

displaying, by the user equipment, the interaction content by using the virtual screen.

The content of interaction between the anchor and the simulated object may be displayed by using the virtual screen, increasing interaction between a user and the anchor.

Further, the method further includes:

displaying, at a position of the simulated object, content of interaction between the simulated object and another simulated object.

Figure 3B:
FIG. 3B is a schematic diagram of an example of a content presenting method according to example embodiments.

In a relatively real recreational zone, players in the 3D application have respective game roles. The roles may talk with each other, and make exemplary actions. Players in a same recreational zone may watch the same content, and have a same topic. As shown in FIG. 3B, a conversation, "what would you like to drink?", that is made by a simulated object with another simulated object may be displayed nearby the simulated object.

A 3D application scenario is broadcasting live game content on a large screen by a game anchor when playing a game. For such a scenario related to an anchor, FIG. 4 is described below.

Figure 4:
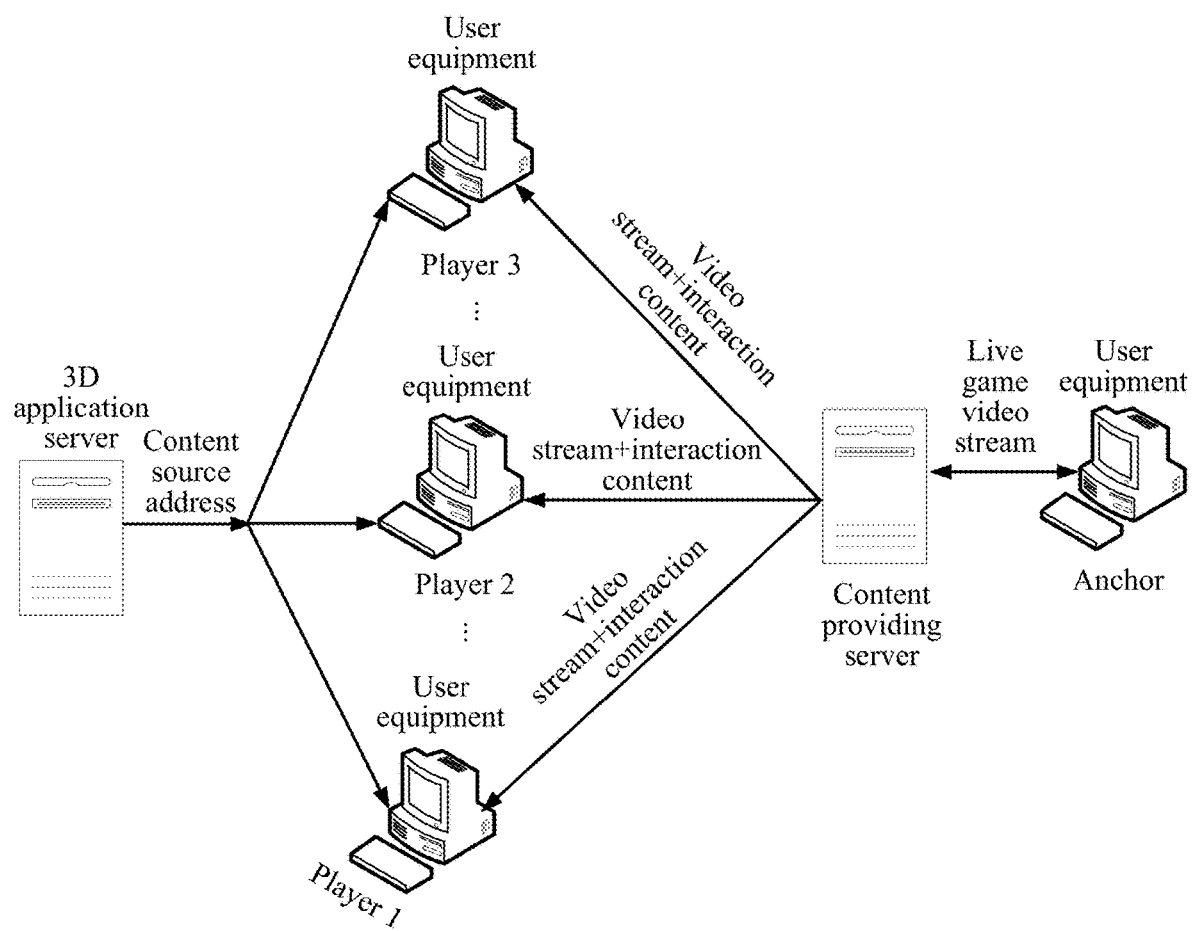
FIG. 4 is a schematic diagram of another example of a 3D application system according to example embodiments.

FIG. 4 is a schematic diagram of another example of a 3D application system according to example embodiments.

As shown in FIG. 4, the 3D application system further includes user equipment used by an anchor. The anchor broadcasts a live game by using the user equipment, and a live game video stream is uploaded to a content providing server. The anchor has registered with a game server in advance; therefore, the game server stores a source address of live content that is currently broadcasted. A player may further interact with the anchor. Therefore, a live broadcasting procedure may further include content of interaction between the anchor and a simulated object. Therefore, user equipment may obtain the live video stream and the interaction content from the content providing server.

The user equipment renders audio and a video after obtaining the live video stream and the interaction content, to obtain corresponding audio content and video content, and plays the audio content by using a 3D application and displays the video content and the interaction content by using the virtual screen.

Figure 5:
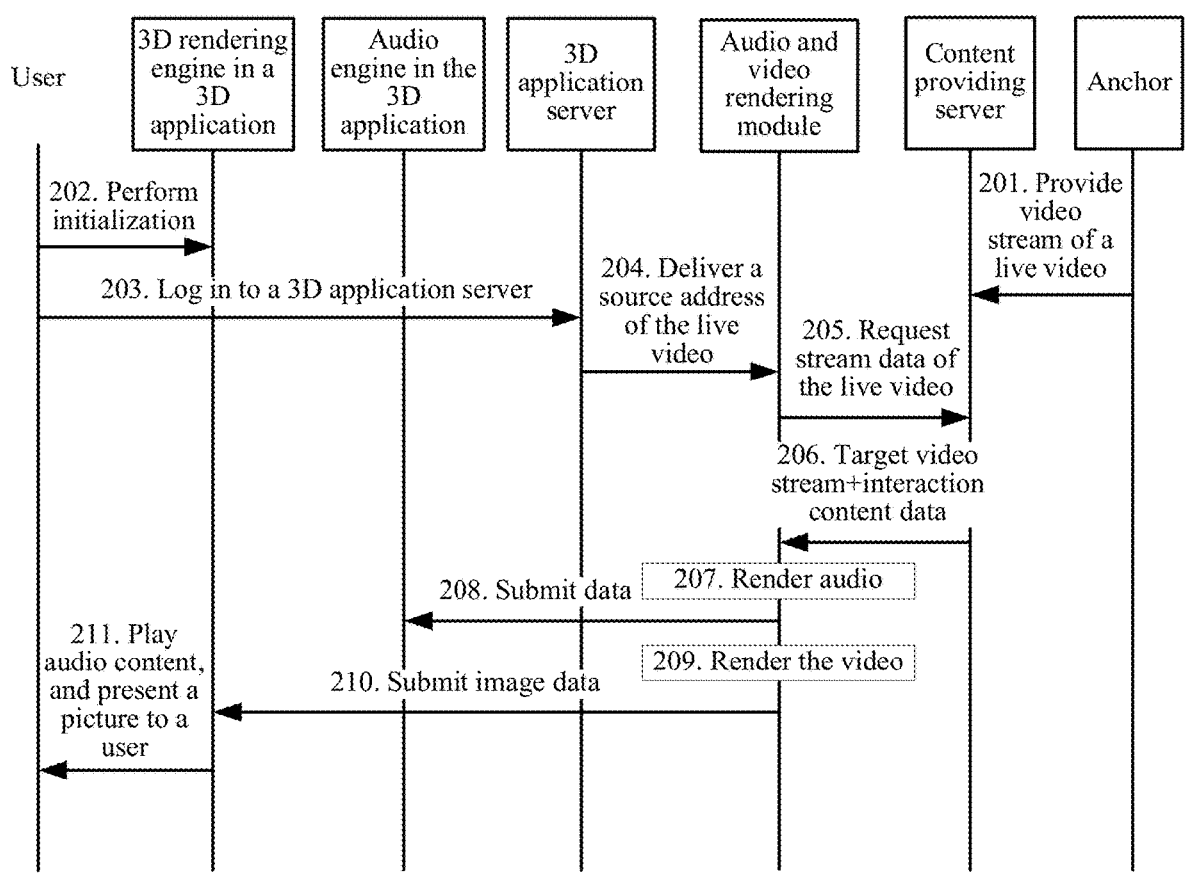
FIG. 5 is a schematic diagram of another example embodiment of a content presenting method according to example embodiments.

The following describes, with reference to FIG. 5, a content presenting method in a scenario including an anchor that performs live broadcasting.

FIG. 5 is a schematic diagram of an example embodiment of a content presenting method according to example embodiments.

201. An anchor broadcasts a live video on the Internet, and the anchor submits, to a content providing server by using user equipment, a live video stream broadcasted by the anchor.

202. After a user opens a 3D application program on a corresponding user equipment, the program starts to initialize a 3D rendering engine in a 3D application.

203. The program starts to automatically request a video source address of the anchor currently performing live broadcasting.

204. A 3D application server delivers the video source address to an audio and video rendering module of the corresponding user equipment.

205. The audio and video rendering module requests a data stream of the live video from the content providing server.

206. A live video server returns a video data stream to the audio and video rendering module.

207. The audio and video rendering module renders audio by using audio and video data.

208. The audio and video rendering module submits audio data to an audio engine in the 3D application.

209. The audio and video rendering module renders a video single-frame image by using the audio and video data.

210. The audio and video rendering module submits image data to the 3D rendering engine in the 3D application.

211. The rendering engine performs rendering in a 3D world by using rendered static frame data, plays audio content, and presents a video picture to the user.

For an image rendering procedure of step 209, it may be understood that because a flash technology frame is generally used for a live video on the Internet, and a used flash plug-in has a plurality of uncertain issues, another independent process is used in this application for rendering a web page, to prevent the flash plug-in from affecting stability of a game. The game may only need to extract a web page to be rendered by cross-process communication when web page rendering data is required. A game process and a web page rendering process can be separated by such processing, increasing stability of the game process.

Figure 6:
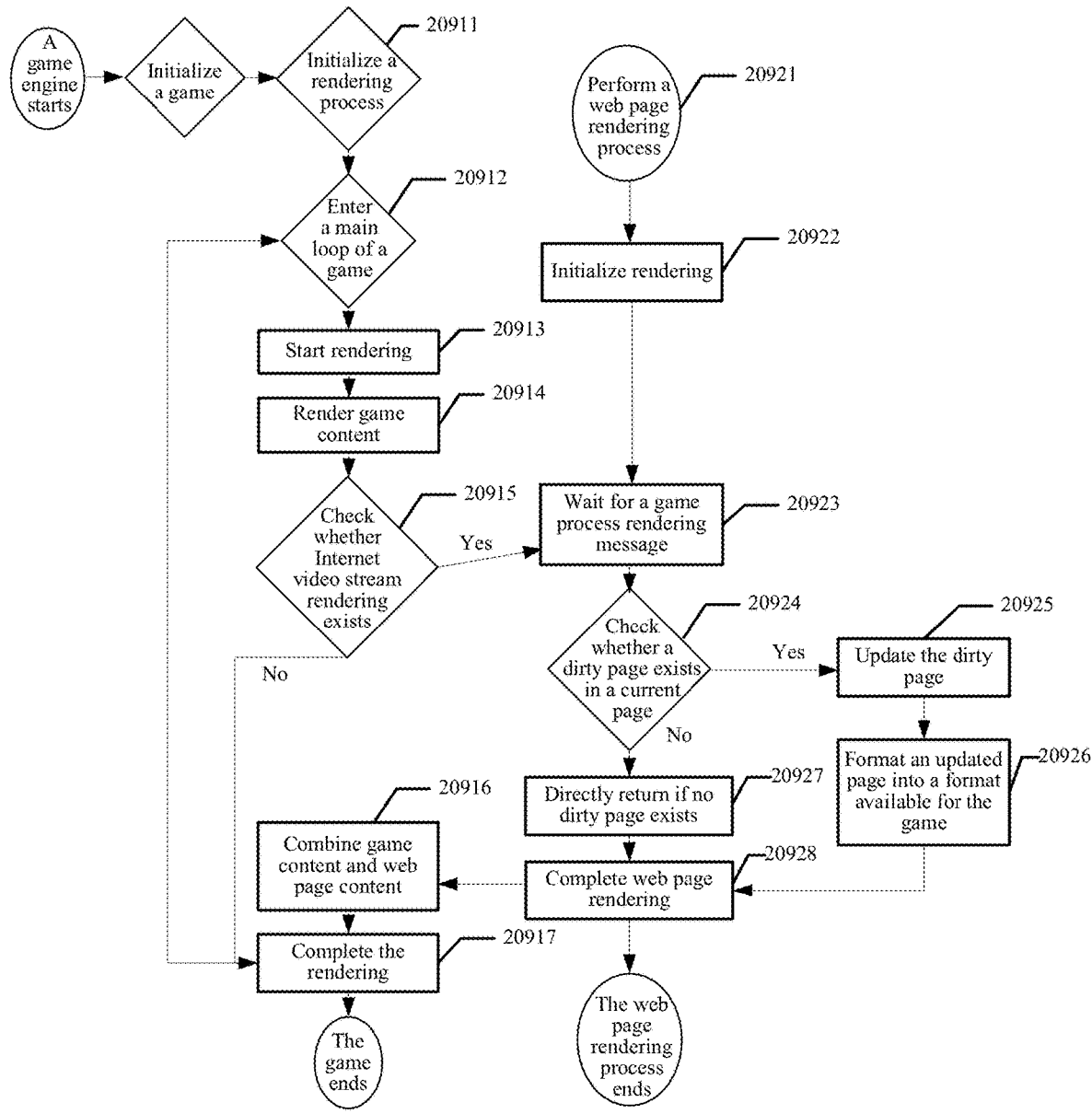
FIG. 6 is a schematic diagram of cross-process image rendering according to example embodiments.

For a cross-process image rendering procedure, refer to FIG. 6 for understanding.

FIG. 6 is a schematic diagram of cross-process image rendering according to example embodiments.

The cross-process image rendering process is divided into two processes: a game rendering process and a web page rendering process. A rendering procedure of the two processes may be performed by the user equipment, and include the following steps:

20911. Perform a game rendering process.
20921. Perform a web page rendering process.
20922. Initialize rendering.
20912. Enter a main loop of a game.
20913. Start rendering.
20914. Render game content.

20915. Check whether Internet video stream rendering exists; and perform step 20923 if an Internet video stream rendering exists, or perform step 20917 if no Internet video stream rendering exists.

20923. Wait for a game process rendering message.

20924. Detect whether a dirty page currently exists; and perform steps 20925 and 20926 if a dirty page currently exists, or perform step 20927 if no dirty page exists currently.

Checking a dirty page means checking whether there is a content difference between two image frames, and differential content is a dirty page if there is a content difference between the two image frames.

20925. Update the dirty page.
20926. Format an updated page into a format available for the game.

Figure 7:
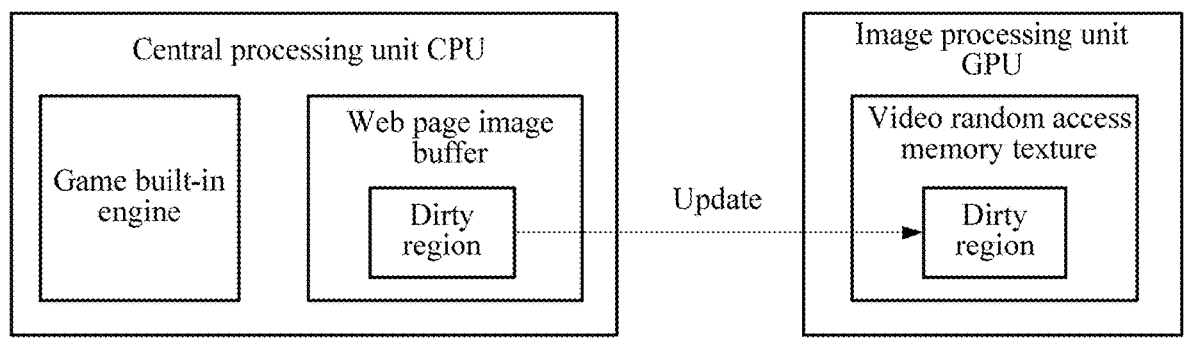
FIG. 7 is a schematic diagram of dirty region update according to example embodiments.

For a procedure of updating a dirty region, refer to FIG. 7 for understanding.

FIG. 7 is a schematic diagram of dirty region update according to example embodiments.

A dirty region of a web page image buffer in a central processing unit (CPU) is updated, to obtain a dirty region in video random access memory (RAM) texture in an image processing unit or graphics processing unit (GPU).

Referring again to FIG. 6, the rendering procedure of the two processes may include the following steps:

20927. Directly return if no dirty page exists.
20928. Complete web page rendering.
20916. Combine game content and web page content.
20917: Complete the rendering.

The main loop of the game may be entered again, to repeat the loop.

The method for updating a dirty region may reduce bandwidth consumption of a GPU, and improve program execution efficiency and user experience.

Image data of Internet video rendering can be obtained after the foregoing steps are performed, but the data cannot be directly used in final rendering. The following focuses on the description of step 211.

A modern graphics engine tends to have a plurality of rendering pipelines, to satisfy different image quantity requirements.

Figure 8:
FIG. 8 is a schematic diagram of an example of a web page according to example embodiments.
Figure 9:
FIG. 9 is a schematic diagram of an example of a web page with an added virtual screen according to example embodiments.
Figure 10:
FIG. 10 is a schematic diagram of an example of a web page with an added virtual screen after inverse gamma correction according to example embodiments.

FIG. 8 is a schematic diagram of an example of a web page according to example embodiments. FIG. 9 is a schematic diagram of an example of a web page with an added virtual screen according to example embodiments. FIG. 10 is a schematic diagram of an example of a web page with an added virtual screen after inverse gamma correction according to example embodiments.

For example, in a high-end rendering pipeline, used maps are maps on which gamma correction has been performed, as shown in FIG. 8. If the gamma correction is not performed, an operation result may be incorrect. In this case, image data submitted from another web page process and obtained in the game process is image data on which gamma correction has been performed, and a color cast may occur if the image data is directly put in the high-end rendering pipeline. For example, as shown in FIG. 9, a color of a picture in FIG. 9 is obviously darker than a color of a picture in FIG. 8, and a color cast occurs.

A browser component obtains, by rendering, a texture on which gamma correction has been performed once, and may need to perform inverse gamma correction once first to obtain linear color space. Then, a picture without a color cast shown in FIG. 10 can be obtained.

For compatibility issues of high-end, middle-end, low-end machines, because a broadcasting screen does not need to be exposed to light, an inverse gamma correction may only need to be performed once, resulting in relatively low rendering consumption. Therefore, the foregoing processing procedure can be used for all of the high-end, middle-end, low-end machines.

A procedure of presenting a video image in a 3D application is completed after the foregoing steps are performed, the following describes output and processing of audio information, that is, focuses on the description of step 207.

Figure 11:
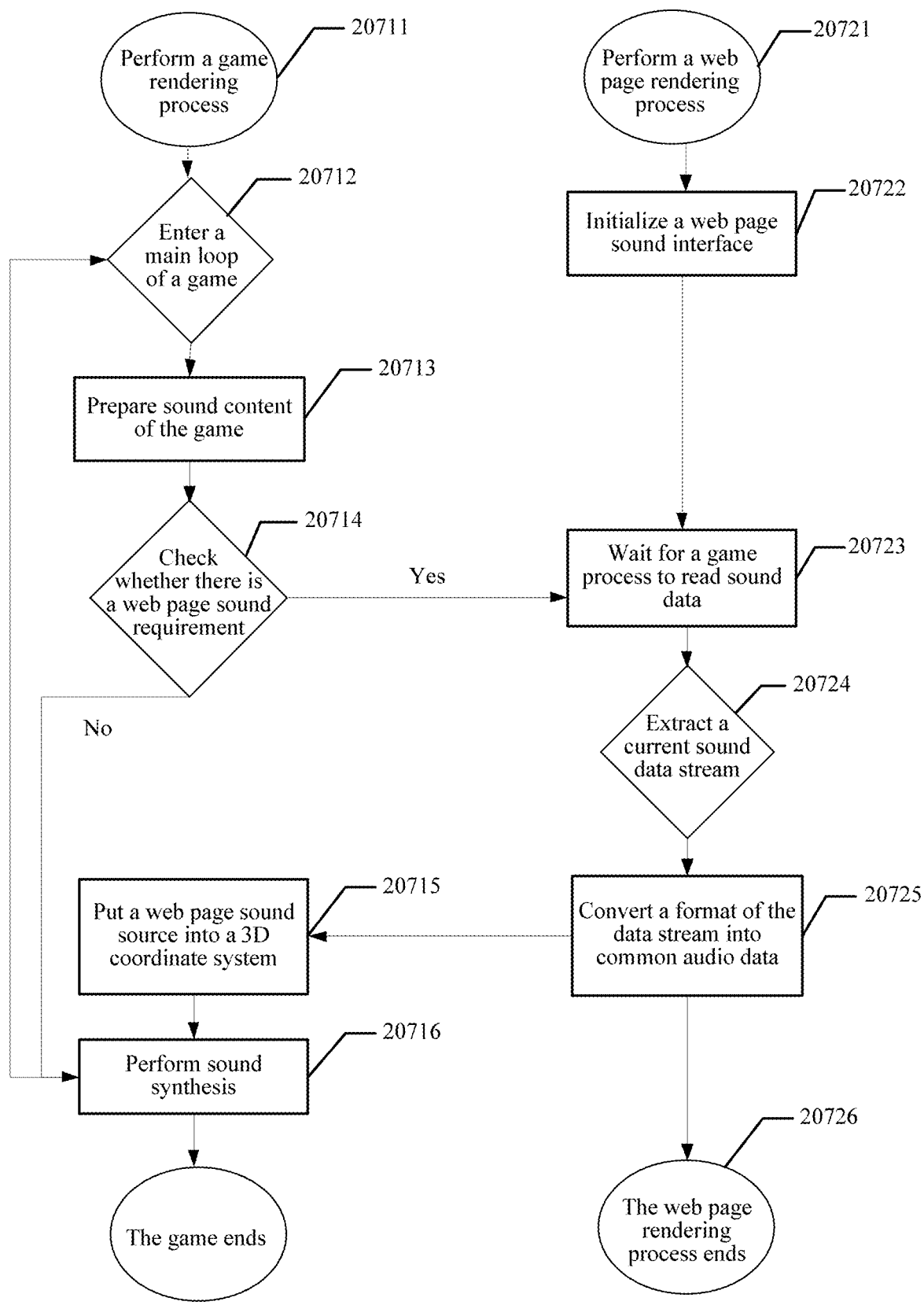
FIG. 11 is a schematic diagram cross-process audio rendering according to example embodiments.

FIG. 11 is a schematic diagram cross-process audio rendering according to example embodiments.

The cross-process audio rendering may be performed by the user equipment, and may include the following steps:

20711. Perform a game rendering process.
20721. Perform a web page rendering process.
20712. Enter a main loop of a game.
20722. Initialize a web page sound interface.
20713. Prepare sound content of the game.
20714. Check whether a web page sound requirement exists; and perform step 20723 if a web page sound requirement exists, or perform step 20716 if no web page sound requirement exists.
20723. Wait for a game process to read sound data.
20724. Extract a current sound data stream.
20725. Convert a format of the data stream into audio data.
20726. The web page rendering process ends.
20715. Put a web page sound source into a 3D coordinate system.
20716. Perform sound synthesis.

The main loop of the game may be entered again, to repeat the loop.

After step 20716, the game may end.

By analyzing a sound interface of a web page rendering engine, this application configures a sound interface applicable to systems such as XP and win7. A data steam may be exported by using the interface, and the obtained data stream may be configured into a 3D coordinate system of a 3D game. In this way, a simulated object of a player may perceive different audio intensity when the simulated object stands at different positions in the game. By the foregoing method, a stereophonic sound effect is implemented.

This application implements a function of playing an Internet video stream in a 3D game, and combines a recreation game with an Internet video, so that a player can watch a favored video program while playing a game, resolving a problem of frequently switching between a browser and the game for the player, and providing intuitive experience in which players watch a competition together, thereby greatly improving game experience of the player.

Figure 12:
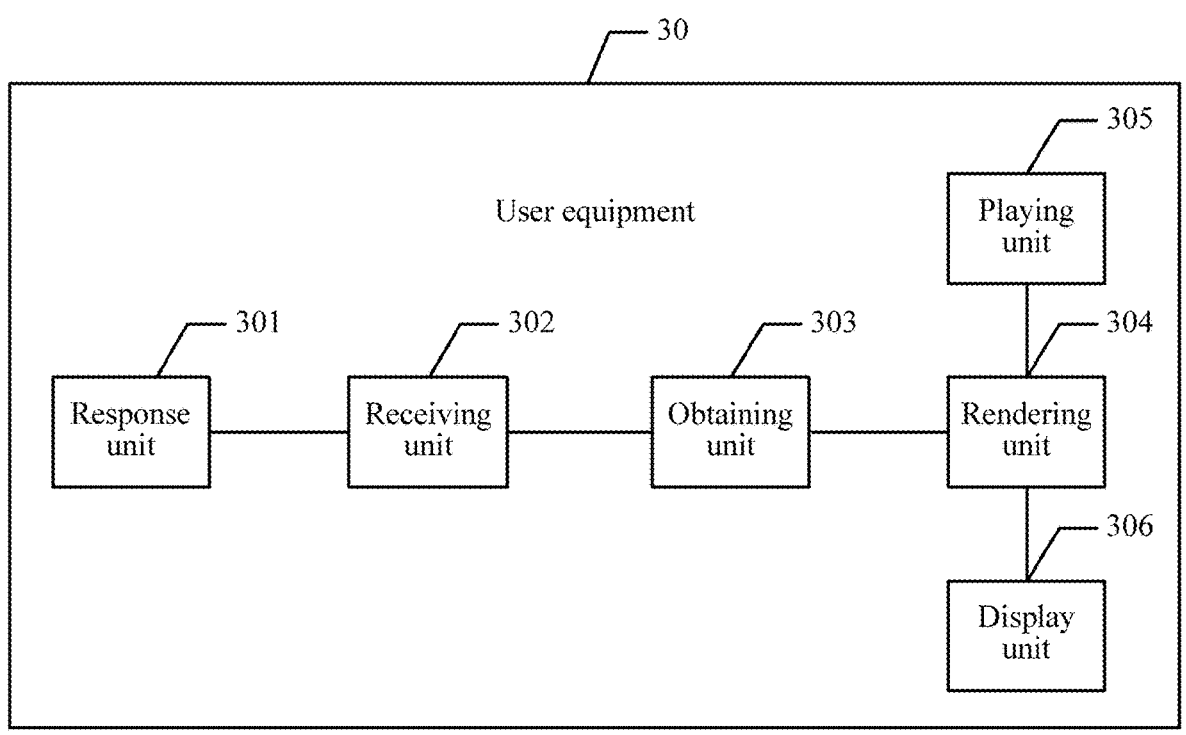
FIG. 12 is a schematic diagram of user equipment according to example embodiments.

FIG. 12 is a schematic diagram of user equipment according to example embodiments.

Referring to FIG. 12, user equipment 30 is applicable to a 3D application system. The 3D application system further includes a 3D application server and a content providing server. The user equipment 30 includes:

a response unit 301, configured to start a 3D application in response to an instruction for starting the 3D application, the 3D application including a simulated object and a virtual screen for watching video content by the simulated object;

a receiving unit 302, configured to: receive a content source address sent by the 3D application server, after the response unit 301 starts the 3D application, the content source address being an address of live content that is currently broadcasted on the 3D application server;

an obtaining unit 303, configured to obtain audio and video data from the content providing server according to the content source address received by the receiving unit 302;

a rendering unit 304, configured to render the audio and video data obtained by the obtaining unit 303, to obtain video content and audio content;

a playing unit 305, configured to play, in the 3D application, the audio content obtained by the rendering unit 304 by rendering; and a display unit 306, configured to display, by using the virtual screen, the video content obtained by the rendering unit 304 by rendering.

In these example embodiments of this application, the response unit 301 starts a 3D application in response to an instruction for starting the 3D application, the 3D application including a simulated object and a virtual screen for watching video content by the simulated object. The receiving unit 302 receives a content source address sent by the 3D application server, after the response unit 301 starts the 3D application, the content source address being an address of live content that is currently broadcasted on the 3D application server. The obtaining unit 303 obtains audio and video data from the content providing server according to the content source address received by the receiving unit 302. The rendering unit 304 renders the audio and video data obtained by the obtaining unit 303, to obtain video content and audio content. The playing unit 305 plays, by using the 3D application, the audio content obtained by the rendering unit 304 by rendering. The display unit 306 displays, by using the virtual screen, the video content obtained by the rendering unit 304 by rendering. A small window may need to be used to display other video content when a 3D application is displayed. By comparison, the user equipment provided in these example embodiments of this application can present video content on a virtual screen of a 3D application without additionally opening a small window by a user, improving video content presentation quality, and also improving efficiency of communication between the user and an interactive application and the video content.

Optionally, based on the example embodiments corresponding to FIG. 12, in a first optional example embodiment of the user equipment:

the rendering unit 304 is configured to: when the audio and video data includes audio data and video data, render the audio data by using a web page process to obtain the audio content, and render the video data by using the web page process to obtain the video content;

the playing unit 305 is configured to play the audio content by using a process of the 3D application; and the display unit 306 is configured to display the video content on the virtual screen by using the process of the 3D application.

Optionally, based on the first optional example embodiment of the user equipment, in a second optional example embodiment of the user equipment:

the rendering unit 304 is configured to: determine, when the video image data includes a plurality of image frames, differential content between an (N+1)th image frame and an Nth image frame when the user equipment renders the (N+1)th image frame by using the web page process, and render only the differential content when rendering the (N+1)th image frame, where N is an integer greater than 0.

Figure 13:
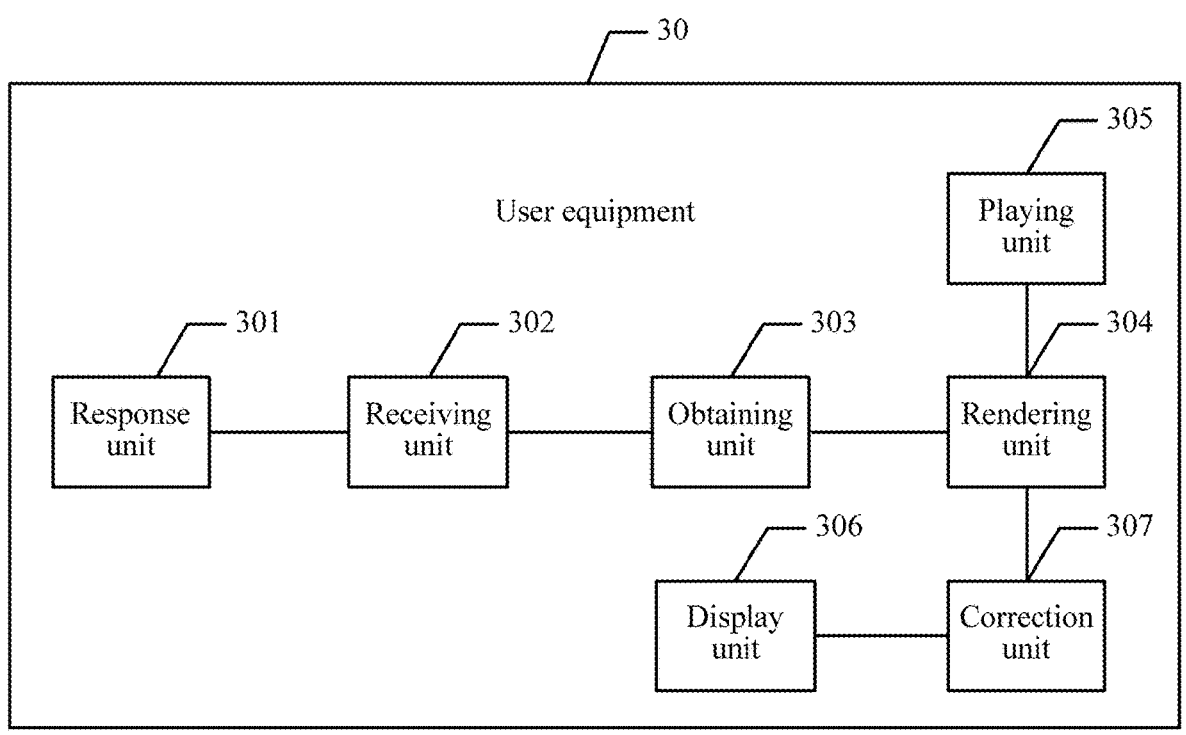
FIG. 13 is a schematic diagram of another example of user equipment according to example embodiments.

FIG. 13 is a schematic diagram of another example of user equipment according to example embodiments.

Optionally, based on the first optional example embodiment of the user equipment, referring to FIG. 13, in a third optional example embodiment of the user equipment, the user equipment further includes a correction unit;

the correction unit 307 is configured to perform inverse gamma correction on texture of the video content once before the display unit 306 displays the video content; and the display unit 306 is configured to display, on the virtual screen by using the process of the 3D application, video content on which the correction unit 307 has performed inverse gamma correction.

Figure 14:
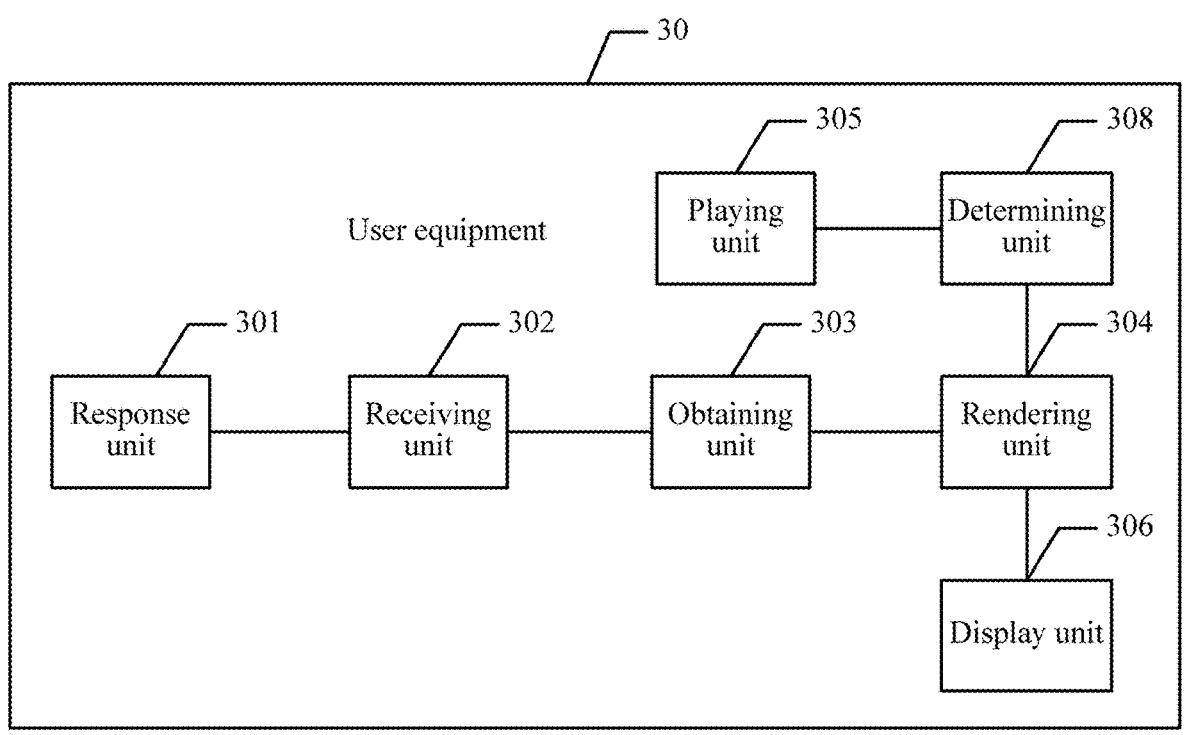
FIG. 14 is a schematic diagram of another example of user equipment according to example embodiments.

FIG. 14 is a schematic diagram of another example of user equipment according to example embodiments.

Optionally, based on any one of the first optional example embodiment to the third optional example embodiment of the user equipment, referring to FIG. 14, in a fourth optional example embodiment of the user equipment, the user equipment further includes a determining unit 308;

the determining unit 308 is configured to: introduce the audio content into a coordinate system of an interactive application to which the simulated object belongs, and determine audio intensity of the audio content at different coordinate points; and the playing unit 305 is configured to play, at the different coordinate points, the audio content according to the audio intensity corresponding to the coordinate points that is determined by the determining unit 308.

Optionally, based on any one of the example embodiments corresponding to FIG. 12, and the first optional example embodiment to the third optional example embodiment of the user equipment, in a fifth optional example embodiment of the user equipment:

the obtaining unit 303 is further configured to obtain content of interaction between an anchor of the video content played on the virtual screen and the simulated object; and the display unit 306 is further configured to display the interaction content by using the virtual screen.

Optionally, based on any one of the example embodiments corresponding to FIG. 12, and the first optional example embodiment to the third optional example embodiment of the user equipment, in a sixth optional example embodiment of the user equipment:

the display unit 306 is further configured to display, at a position of the simulated object, content of interaction between the simulated object and another simulated object.

For the user equipment 30, refer to related descriptions in FIG. 1 to FIG. 11 for understanding, and details are not described herein.

Figure 15:
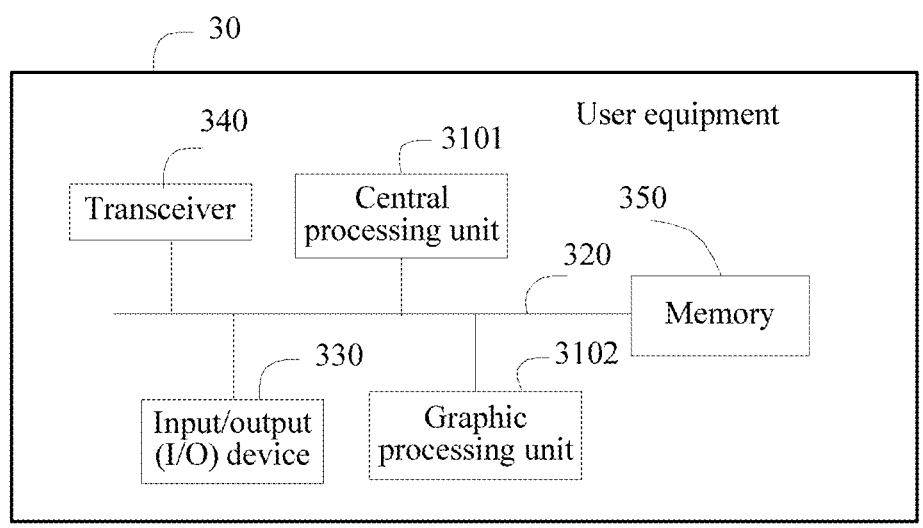
FIG. 15 is a schematic structural diagram of user equipment according to example embodiments.

FIG. 15 is a schematic structural diagram of the user equipment 30 according to example embodiments. The user equipment 30 is applied to a 3D application system, and the 3D application system includes the user equipment, a 3D application server, and a content providing server. The user equipment 30 includes a CPU 3101, a GPU 3102, a transceiver 340, a memory 350, and an input/output (I/O) device 330. The input/output device 330 may be a keyboard or a mouse, and the GPU 3102 is configured to render a graph. The memory 350 may include a read-only memory (ROM) and a RAM, and provide operation instructions and data to a processor 310. A part of the memory 350 may further include a non-volatile random access memory (NVRAM).

In some implementations, the memory 350 stores the following elements: an executable module or a data structure, or a subset thereof, or an extension set thereof.

In these example embodiments of this application, by invoking the operation instructions (the operation instructions may be stored in an operating system) stored in the memory 350:

the input/output device 330 is configured to receive an instruction for starting a 3D application;

the CPU 3101 is configured to start the 3D application in response to the instruction for starting the 3D application, the 3D application including a simulated object and a virtual screen for watching video content by the simulated object;

the transceiver 340 is configured to receive a content source address sent by the 3D application server, the content source address being an address of live content that is currently broadcasted on the 3D application server;

the CPU 3101 is configured to obtain audio and video data from the content providing server according to the content source address;

the GPU 3102 is configured to render the audio and video data to obtain video content and audio content; and the input/output device 330 is configured to play the audio content in the 3D application, and display the video content by using the virtual screen.

A small window may need to be used to display other video content when a 3D application is displayed. By comparison, the user equipment provided in these example embodiments of this application can present video content on a virtual screen of a 3D application without additionally opening a small window by a user, improving video content presentation quality, and also improving efficiency of communication between the user and an interactive application and the video content.

The CPU 3101 controls an operation of the user equipment 30. The memory 350 may include a ROM and a RAM, and provide instructions and data to the CPU 3101. A part of the memory 350 may further include a NVRAM. In an application, all components of the user equipment 30 are coupled by using a bus system 320, and besides a data bus, the bus system 320 may further include a power source bus, a control bus, a state signal bus, and the like. However, for purpose of clear description, various types of buses in the figure are all marked as the bus system 320.

The methods disclosed in the foregoing example embodiments of this application are applicable to the processor 310, or may be implemented by the processor 310. The processor 310 may be an integrated circuit chip and have a signal processing capability. During implementation, each step of the foregoing methods may be implemented by a hardware integrated logic circuit in the processor 310 or by an instruction in a software form. The processor 310 may be a general-purpose processor, a digital signal processor (DSP), an application-specific integrated circuit (ASIC), a field programmable gate array (FPGA), or another programmable logic device, discrete gate or transistor logic device, or discrete hardware component. The processor 310 may implement or execute the methods, steps, and logical block diagrams disclosed in the example embodiments of this application. The general-purpose processor may be a microprocessor or the processor may be any conventional processor or the like. The steps of the methods disclosed with reference to the example embodiments of this application may be directly executed and completed by a hardware decoding processor, or may be executed and completed by using a combination of hardware and software modules in the decoding processor. The software module may be located in a mature storage medium in the field, such as a RAM, a flash memory, a ROM, a programmable read-only memory, an electrically-erasable programmable memory, or a register. The storage medium is located in the memory 350, and the processor 310 reads information in the memory 350 and completes the steps in the foregoing methods in combination with hardware of the processor 350.

Optionally, the GPU 3102 is configured to render the audio data by using a web page process to obtain the audio content, and render the video data by using the web page process to obtain the video content; and the input/output device 330 is configured to play the audio content by using a process of the 3D application, and display the video content on the virtual screen by using the process of the 3D application.

Optionally, the GPU 3102 is configured to determine differential content between an (N+1)th image frame and an Nth image frame when the user equipment renders the (N+1)th image frame by using the web page process, and render only the differential content when rendering the (N+1)th image frame, where N is an integer greater than 0.

Optionally, the CPU 3101 is configured to perform, by the user equipment, inverse gamma correction on texture of the video content once; and the input/output device 330 is configured to display, on the virtual screen by using the process of the 3D application, video content on which inverse gamma correction has been performed.

Optionally, the CPU 3101 is configured to introduce the audio content into a coordinate system of an interactive application to which the simulated object belongs, and determine audio intensity of the audio content at different coordinate points; and the input/output device 330 is configured to play, at the different coordinate points, the audio content according to the audio intensity corresponding to the coordinate points.

Optionally, the CPU 3101 is configured to obtain content of interaction between an anchor of the video content played on the virtual screen and the simulated object; and the input/output device 330 is configured to display the interaction content by using the virtual screen.

Optionally, the input/output device 330 is configured to display, at a position of the simulated object, content of interaction between the simulated object and another simulated object.

For the user equipment 30, refer to related descriptions in FIG. 1 to FIG. 11 for understanding, and details are not described herein.

A person of ordinary skill in the art may understand that all or some of the steps of the methods in the example embodiments may be implemented by a program instructing relevant hardware. The program may be stored in a computer readable storage medium. The storage medium may include: a ROM, a RAM, a magnetic disk, or an optical disc.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The content presenting method, the user equipment, and the system provided in the example embodiments of this application are described in detail above. Principles and implementations of this application have been explained herein with reference to the example embodiments. The example embodiments are used only to help understand the method and core thought of this application. A person of ordinary skill in the art can have variations in implementations and the application scope based on thoughts of this application. In conclusion, content of the present specification may not be considered as a limitation on this application.

What is claimed is:

1. A content presenting method of a three-dimensional (3D) application system, the 3D application system comprising user equipment of an end user, a 3D application server, and a content providing server, and the method comprising:

starting, by the user equipment, a 3D application, in response to an instruction, the 3D application presenting a simulated object of the end user and a virtual screen for displaying live content in a virtual environment;

receiving, by the user equipment, a content source address of the live content that is provided by another user equipment of an anchor to the content providing server, and that is currently broadcasted on the content providing server;

obtaining, by the user equipment, audio data and video data of the live content from the content providing server, based on the content source address;

rendering, by the user equipment, the audio data and the video data to obtain video content and audio content;

introducing, by the user equipment, the audio content into a 3D coordinate system of the 3D application system;

determining, by the user equipment, at different 3D coordinate points of the 3D coordinate system, audio intensities of the audio content for the simulated object in relation to location of the virtual screen and location of the simulated object;

playing, by the user equipment, the audio content in the 3D application system, using the audio intensities for the simulated object;

obtaining, by the user equipment, content of interaction between the anchor of the video content displayed using the virtual screen and the simulated object; and displaying, by the user equipment, the video content and the content of interaction on the virtual screen.

2. The method according to claim 1, wherein the rendering the audio data and the video data comprises:

rendering, by the user equipment, the audio data, using a web page process, obtain the audio content, the web page process being independent of the 3D application; and rendering, by the user equipment, the video data, using the web page process to obtain the video content.

3. The method according to claim 2, wherein the video data comprises a plurality of image frames, and the rendering the video data, using the web page process, comprises rendering, by the user equipment, an (N+1)

th image frame among the plurality of image frames, using the web page process, N being an integer greater than 0, by:
determining, by the user equipment, differential content between an (N+1)th image frame and an Nth image frame among the plurality of image frames; and
rendering, by the user equipment, the differential content.

4. The method according to claim 1, further comprising, before the displaying the video content, performing, by the user equipment, inverse gamma correction on texture of the video content,
wherein the displaying the video content comprises displaying, by the user equipment, on the virtual screen, the texture of the video content on which the inverse gamma correction is performed.

5. The method according to claim 1, wherein the live content is a live game video broadcasted by the another user equipment of the anchor.

6. The method according to claim 1, further comprising displaying, by the user equipment, at a position of the simulated object, another content of interaction between the simulated object and another simulated object.

7. User equipment of an end user of a three-dimensional (3D) application system, the 3D application system further comprising a 3D application server and a content providing server, and the user equipment comprising:
at least one memory configured to store computer program code; and
at least one processor configured to access the at least one memory and operate according to the computer program code, the computer program code comprising:
response code configured to cause the at least one processor to start a 3D application, in response to an instruction, the 3D application presenting a simulated object of the end user and a virtual screen for displaying live content in a virtual environment;
receiving code configured to cause the at least one processor to receive a content source address of the live content that is provided by another user equipment of an anchor to the content providing server, and that is currently broadcasted on the content providing server;
obtaining code configured to cause the at least one processor to obtain audio data and video data of the live content from the content providing server, based on the content source address, and to obtain content of interaction between the anchor of the video content displayed using the virtual screen and the simulated object;
rendering code configured to cause the at least one processor to render the audio data and the video data to obtain video content and audio content;
introducing code configured to cause the at least one processor to introduce the audio content into a 3D coordinate system of the 3D application system;
determining code configured to cause the at least one processor to determine, at different 3D coordinate points of the 3D coordinate system, audio intensities of the audio content for the simulated object in relation to location of the virtual screen and location of the simulated object;
playing code configured to cause the at least one processor to play the audio content in the 3D application system, using the determined audio intensities for the simulated object; and
displaying code configured to cause the at least one processor to display the video content and the content of interaction on the virtual screen.

8. The user equipment according to claim 7, wherein the rendering code is further configured to cause the at least one processor to:
render the audio data, using a web page process, obtain the audio content, the web page process being independent of the 3D application; and
render the video data, using the web page process to obtain the video content.

9. The user equipment according to claim 8, wherein the video data comprises a plurality of image frames, and
the rendering code is further configured to cause the at least one processor to render an (N+1)th image frame among the plurality of image frames, using the web page process, N being an integer greater than 0, by:
determining differential content between an (N+1)th image frame and an Nth image frame among the plurality of image frames; and
rendering the differential content.

10. The user equipment according to claim 7, further comprising correcting code configured to cause the at least one processor to, before the video content is displayed, perform inverse gamma correction on texture of the video content,
wherein the displaying code is further configured to cause the at least one processor to display, on the virtual screen, the texture of the video content on which the inverse gamma correction is performed.

11. The user equipment according to claim 7, wherein the displaying code is further configured to cause the at least one processor to display, at a position of the simulated object, another content of interaction between the simulated object and another simulated object.

12. A non-transitory computer-readable storage medium storing instructions that cause a processor of user equipment of an end user to:
start a 3D application, in response to an instruction, the 3D application presenting a simulated object of the end user and a virtual screen for displaying live content in a virtual environment;
receive a content source address of the live content that is provided by another user equipment of an anchor to the content providing server, and that is currently broadcasted on content providing server;
obtain audio data and video data of the live content from the content providing server, based on the content source address;
render the audio data and the video data to obtain video content and audio content;
introduce the audio content into a 3D coordinate system of the 3D application system;
determine at different 3D coordinate points of the 3D coordinate system, audio intensities of the audio content for the simulated object in relation to location of the virtual screen and location of the simulated object;
play the audio content in the 3D application system, using the determined audio intensities for the simulated object;
obtain content of interaction between the anchor of the video content displayed using the virtual screen and the simulated object; and
display the video content and the content of interaction on the virtual screen.

13. The non-transitory computer-readable storage medium according to claim 12, wherein the instructions further cause the processor to:

render the audio data, using a web page process, obtain the audio content, the web page process being independent of the 3D application; and render the video data, using the web page process to obtain the video content.

14. The non-transitory computer-readable storage medium according to claim 13, wherein the video data comprises a plurality of image frames, and the instructions further cause the processor to render an (N+1)th image frame among the plurality of image frames, using the web page process, N being an integer greater than 0, by:

determining, by the user equipment, differential content between an (N+1)th image frame and an Nth image frame among the plurality of image frames; and rendering, by the user equipment, the differential content.

15. The non-transitory computer-readable storage medium according to claim 12, wherein the instructions further cause the processor to:

before the displaying the video content, perform inverse gamma correction on texture of the video content; and display on the virtual screen, the texture of the video content on which the inverse gamma correction is performed.

* * * * *